United States Patent [19]

Okita et al.

[11] Patent Number: 6,040,351
[45] Date of Patent: Mar. 21, 2000

[54] FOAM RUBBER COMPOSITION AND A MOLDED PRODUCT OF FOAM RUBBER

[75] Inventors: Tomoaki Okita, Kasugai; Katsumi Nakashima, Ichinomiya; Takashi Mizushima, Nagoya; Takeru Wadaki, Ichihara, all of Japan

[73] Assignee: Toyoda Gosei Co. Ltd., Aichi-ken, Japan

[21] Appl. No.: 09/090,996

[22] Filed: Jun. 5, 1998

[30] Foreign Application Priority Data

Jun. 6, 1997 [JP] Japan .................................... 9-149026

[51] Int. Cl.$^7$ ........................................................ C08J 9/10
[52] U.S. Cl. .............................. 521/140; 521/81; 521/89; 521/93; 521/94; 521/95; 521/98; 521/99; 525/89; 525/99; 525/211; 525/240
[58] Field of Search .................................. 521/94, 95, 89, 521/93, 81, 98, 140, 99; 525/99, 89, 211, 240

[56] References Cited

U.S. PATENT DOCUMENTS 4,307,204 12/1981 Vidal ........................................ 521/95

5,691,413 11/1997 Morikawa et al. ..................... 521/140

*Primary Examiner*—Morton Foelak
*Attorney, Agent, or Firm*—Pillsbury Madison & Sutro Intellectual Property Group

[57] ABSTRACT

A foam rubber composition and a method for making same which is foamable to a high degree and a molded product made from the foam rubber composition wherein the compositions has: (A) a low-molecular Ethylene-propylene-5-ethylidene-2-norbornene terpolymer having a Mooney viscosity ($ML_{1+4}$ at 100° C.) of 20 to 40, an ethylene/propylene ratio by weight of 65/35 to 50/50, an iodine value of 20 to 30, and a Q value (Mw/Mn) not exceeding 3 as determined by gel permeation chromatography; (B) a high-molecular ethylene-propylene-5-ethylidene-2-norbornene terpolymer having a Mooney viscosity ($ML_{1+4}$ at 100° C.) of 100 to 300, an ethylene/propylene ratio by weight of 65/35 to 50/50, an iodine value of 20 to 30 and a Q value (Mw/Mn) of 6 to 10; (C) a vulcanizing system agent containing sulfur as a vulcanizer, and zinc carbamate and sulfenamide as accelerators; and (D) a foaming agent containing N, N'-dinitrosopentamethylenetetramine and urea.

22 Claims, 1 Drawing Sheet

6,040,351

FOAM RUBBER COMPOSITION AND A MOLDED PRODUCT OF FOAM RUBBER

BACKGROUND OF THE INVENTION

1. Field of the Invention

This invention relates to a foam rubber composition and a molded product of foam rubber. More particularly, it relates to a foam rubber composition which contains an ethylenepropylene-5-ethylidene-2-norbornene copolymer (hereinafter referred to as "ENB type EPDM") as its rubber component, maintains an outstanding level of workability, is formable to a high degree, and has a high rigidity, a low compression set and a high shape-retaining property, and to a molded product made of this foam rubber composition.

2. Description of Related Art

An ENB type EPDM is widely used for making automobile parts owing to its outstanding properties including weather, heat and ozone resistance. The ENB type EPDM is an ethylenepropylene-unconjugated diene terpolymer containing 5-ethylidene-2-norbornene as its unconjugated diene. The applicable automobile parts include at weather strip W1 (see FIG. 1) and a hose protector which are made by foaming a rubber copolymer and molding it. The sponge rubber which is used for such purposes is required to have a high rigidity, a low compression set and a high shape-retaining property for maintaining a high sealing property for a long period of time, while from the standpoint of cost reduction, etc., it is required to be formable to a high degree. These requirements have recently become increasingly more stringent. However, no conventional rubber has been found that is satisfactory for maintaining an outstanding level of workability, formable to a high degree, having a high rigidity, a low compression set and a high shape-retaining property.

SUMMARY OF THE INVENTION

Under these circumstances, it is an object of this invention to provide a foam rubber composition which contains an ENB type EPDM as its rubber component, maintains an outstanding level of workability, is formable to a high degree, has a high rigidity, a low compression set and a high shape-retaining property.

This object is attained by a foam rubber composition comprising:

(A) a low-molecular ethylene-propylene-5-ethylidene-2norbornene terpolymer having a Mooney viscosity ($ML_{1+4}$ at 100° C.) of 20 to 40, an ethylene/propylene ratio by weight of 65/35 to 50/50, an iodine value of 20 to 30 and a Q value (Mw/Mn) not exceeding 3;

(B) a high-molecular ethylene-propylene-5-ethylidene-2norbornene terpolymer having a Mooney viscosity ($ML_{1+4}$ at 100° C.) of 100 to 300, an ethylene/propylene ratio by weight of 65/35 to 50/50, an iodine value of 20 to 30 and a Q value (Mw/Mn) of 6 to 10;

(C) a vulcanizing system agent containing sulfur as a vulcanizer, and zinc carbamate and sulfonamide as accelerators; and (D) a foaming agent containing N, N'-dinitrosopentamethylenetetramine (DPT) and urea; the composition having an (A)/(B) ratio by weight of 45/55 to 15/85, and containing 3.0 to 6.0 parts by weight of (C) and 3.0 to 8.0 parts by weight of (D) relative to a total of 100 parts by weight of (A) and (B).

The Q value (Mw/Mn) is the ratio of weight-average molecular weight/number-average molecular weight as determined by gel permeation chromatography (GPC).

It is another object of this invention to provide a molded product of foam rubber. This object is attained by a product molded from a foam rubber composition as defined above.

DETAILED DESCRIPTION OF THE INVENTION

Figure 1:
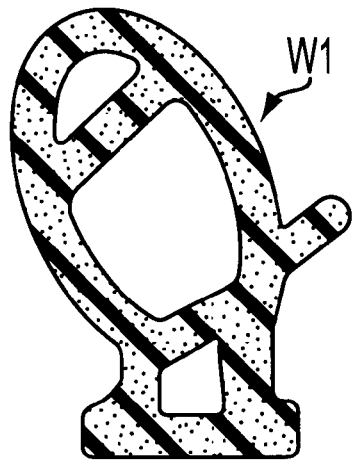
FIG. 1 is a cross sectional view of a door weather strip shown as an example of a molded product of foam rubber embodying this invention.

The components of the rubber composition according to this invention will now be described in more detail. In the following description, the parts are referred to on a weight basis unless otherwise noted.

A. The rubber composition of this invention comprises four components (A) to (D) as stated below.

1. Component (A)—Low-molecular ENB type EPDM:
Component (A) must satisfy the following requirements:

(1) It has a Mooney viscosity ($ML_{1+4}$ at 100° C.) of from about 20 to about 40, preferably from 25 to 35. If its Mooney viscosity is too low, a sponge is obtained having an undesirably rough skin and a high compression set, and if it is too high, the composition has a low level of extrusion workability.

(2) It has an ethylene/propylene ratio by weight (C2/C3) of from about 65/35 to about 50/50, preferably from 60/40 to 50/50. If its C2/C3 ratio is too small, the vulcanized rubber (a molded product) is low in strength, etc., and if it is too large, the product is low in cold resistance.

(3) It has an iodine value of from about 20 to about 30, and preferably from 24 to 30. If its iodine value is too low, the vulcanized rubber has a low crosslinking density and a high compression set, and if it is too high, no further improvement in compression set can be expected.

(4) It has a Q value (Mw/Mn) preferably not exceeding 3. If it exceeds 3, the composition is lower in workability.

(5) The component (A) can be prepared by, for example, a customary process employing a Ziegler-Natta catalyst. A commercially available product may also be used.

2. Component (B)—High-molecular ENB type EPDM:
Component (B) must satisfy requirements:

(1) It has a Mooney viscosity ($ML_{1+4}$ at 100° C.) of from about 100 to about 300, preferably from 100 to 200, and more preferably from 100 to 150. If its Mooney viscosity is too low, the composition has a low capacity of holding the gas produced by the decomposition of a foaming agent, and the molded product has a low level of shape-retaining property. If it is too high, the composition is low in kneading and extrusion workability.

(2) It has an ethylene/propylene ratio by weight (C2/C3) of from about 65/35 to about 50/50, and preferably from 60/40 to 50/50. If its C2/C3 ratio is too small, the vulcanized product is low in strength, etc., and if it is too large, the product is low in cold resistance.

(3) It has an iodine value of from about 20 to about 30, and preferably from 20 to 25. If its iodine value is too low, the vulcanized rubber has a low crosslinking density and a high compression set, and if it is too high, no further improvement the following in compression set can be expected.

(4) It has a Q value (Mw/Mn) of about 6 to about 10, preferably from 7 to 10, and more preferably from 7 to 8. If its Q value is too low, the composition has a low capacity of holding the gas produced by the decomposition of a foaming agent, and the molded product has a low level of shape-retaining property. If it is too high, the extruded product is likely to have an undesirably rough skin.

(5) The component (B) can be prepared by, for example, a known process employing a Ziegler-Natta catalyst. A commercially available product may also be used.

3. Component (C)—Vulcanizing system agent:

The vulcanizing system agent contains sulfur as a vulcanizer (crosslinking agent), and zinc carbamate and sulfenamide as accelerators, as its essential constituents. The absence of any one of these vulcanizing accelerators is likely to result in insufficient vulcanization and the escape of gas during foaming.

The agent may contain sulfur, zinc carbamate and sulfenamide in a ratio of, for example, 1:3:3 to 4:2:1 and a preferred ratio is 2:2:1.

Specific examples of the zinc carbamates which can be used as a vulcanizing accelerator are zinc dibutyldithiodicarbamate (BZ), zinc diethyldithiodicarbamate (EZ), zinc dimethyldithiodicarbamate (PZ), and zinc N-ethyl-N-phenyl-dithiocarbamate (PX).

Specific examples of the sulfenamides which can be used as a vulcanizing accelerator are N-cyclohexyl-2-benzothiazolyzsulfenamide (CZ), N,N-dicyclohexyl-2-benzothiazolylsulfenamide (DZ), N-tert-butyl-2-benzothiazolylsulfenamide (NS), and N-oxyethylene-2-benzothiazolylsulfenamide (MSA-G).

Any other thiazole type vulcanizing accelerator may be used in addition to the vulcanizing accelerators zinc carbamate and sulfenamide.

4. Component (D)—Foaming agent:

This is an agent which is decomposed by heating to generate gas, such as nitrogen, carbon dioxide, carbon monoxide and ammonia, in a matrix to thereby form a cellular structure. The agent contains N,N'-dinitrosopentamethylenetetramine (DPT) as a foaming agent and urea as a foaming assistant, as its essential constituents. Foam rubber having the desired physical properties is difficult to obtain by using any other combination. The foaming agent and assistant may be mixed in, for example, approximately equal proportions.

B. Proportions of components (A) to (D) in the rubber composition:

The composition may have an (A)/(B) ratio by weight of from about 45/55 to about 15/85, and contain about 3.0 to about 6.0 parts of (C) and about 3.0 to about 8.0 parts of (D) relative to a total of 100 parts of (A) and (B).

It preferably has an (A)/(B) ratio by weight of from 40/60 to 20/80, and contain 3.5 to 5.0 parts of (C) and 4.0 to 6.0 parts of (D) relative to a total of 100 parts of (A) and (B).

If its (A)/(B) ratio is too small, the composition is too high in viscosity and low in extrusion workability, and if it is too large, it is too low in viscosity and may fail to form a highly foamed sponge. If its (C) content is too low, the composition fails to be satisfactorily vulcanized and foamed, and if it is too high, whitening, such as blooming, is likely to occur. If its (D) content is too low, the composition fails to be satisfactorily foamed, and if it is too high, the composition is undesirably expensive.

The rubber composition of this invention may further contain about 50 to about 68 parts, and preferably 52 to 65 parts, of process oil (softening agent) as component (E) relative to a total of 100 parts of (A) and (B). It may further contain about 80 to about 95 parts, and preferably 82 to 93 parts, of carbon black as component (F) relative to a total of 100 parts of (A) and (B). The addition of (E) and (F) in the ranges as specified is preferable to ensure the manufacture of a molded product of a highly foamed rubber having a high rigidity.

If the proportion of process oil (E) is too high, there is only obtained a product of low rigidity. As the process oil, it is possible to use, for example, any paraffin or naphthene oil that is usually employed for addition to rubber, but paraffin oil is preferred for its better resistance to paint staining.

If the proportion of carbon black (F) is too low, a product of low rigidity is obtained, and if it is too high, an insufficiently foamed product is obtained. High structure carbon, particularly of the SRF type such as N-762 (ASTM D 1765), is preferably used as the carbon black.

C. Preparation of the rubber composition and the manufacture of a molded product:

Any customary process can be employed for preparing the rubber composition of this invention. For example, the components (A) and (B), as well as optionally (E) and (F), are kneaded by a BANBURY MIXER (trademark of Farrel-Birmingham Co.), or other kneading machine. The kneaded mixture is put in another kneader, or roll mixer, and kneaded with components (C) and (D), and optionally another vulcanizing assistant to form a rubber composition.

The rubber composition is vulcanized and foamed to make a molded product of foam rubber. A customary process can be used for vulcanizing and foaming the rubber composition. For example, continuous fluidized bed vulcanization, or vulcanization by a particle curing medium (PCM), such as glass beads, is preferably employed. However, microwave, hot air, or press vulcanization can also be employed. A single method, or a combination of two methods is usually employed. A temperature of about 180° C. to about 210° C. may, for example, be employed for about 3 to about 15 minutes of vulcanization by a PCM.

A description of Examples employed for embodying this invention and ascertaining the results thereof, as well as Comparative Examples will now be made. For details of the polymers used in the Examples or Comparative Examples, see Table 1 below.

EXAMPLES 1 TO 3 AND COMPARATIVE EXAMPLES 1 TO 5

Components (A), (B), (E) and (F) as shown in Table 2 below were kneaded with 10 parts of zinc white and 5 parts of stearic acid in a Banbury mixer. The kneaded mixture was put in a separate kneader, and kneaded with components (C) and (D) as shown in Table 2 to form a rubber composition.

Figure 2:
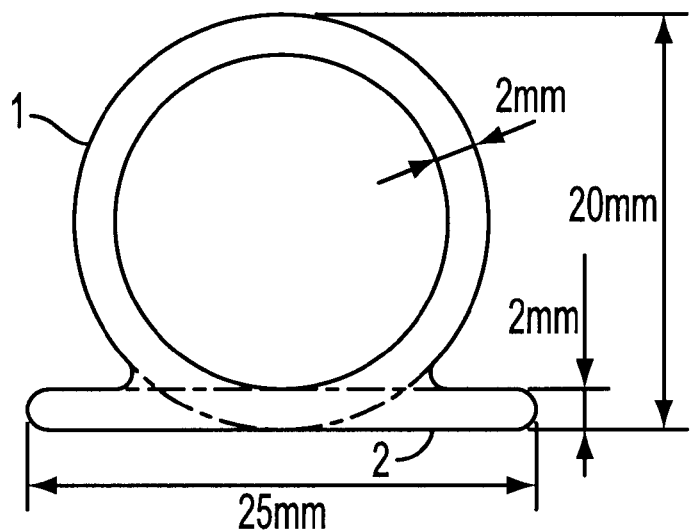
FIG. 2 is a cross sectional view of an extruded product as employed for the evaluation of this invention.

The rubber composition was extruded through an extruder, and vulcanized at 200° C. for five minutes by using a PCM to yield a molded product of foam rubber having a cross sectional shape defined by a ring 1 and a flat portion 2 as shown in FIG. 2. The product was examined or tested for its skin roughness, compression set, specific gravity and rigidity. The results are shown in Table 2.

The following is a summary of the methods employed for determining the properties of the polymers as shown in Table 1 and for examining or testing the product:

(1) Ethylene/propylene ratio (C2/C3): By a method using the infrared absorption spectrum;

(2) Iodine value: By a method using the infrared absorption spectrum;

(3) Mooney viscosity ($ML_{1+4}$ at 100° C.): By reading the meter four minutes after the start of rotation after one minute of preheating at 100° C.;

(4) Q value (Mw/Mn): By comparing the weight- and number-average molecular weights as determined by GPC;

(5) Skin roughness: RZD (roughness of mean value of ten points height of irregularities, see DIN-4768) as measured by a surface meter;

(6) Compression set: As determined after 200 hours of compression at 70° C.;

(7) Specific gravity: As determined by displacement in water;

(8) Rigidity: As determined by a low elongation stress test.

As is shown in Table 2, the products of Examples 1 to 3 of this invention showed satisfactory results in all of the items of evaluation, i.e., a skin roughness <20 RZD, a compression set <40%, a specific gravity <0.45, and low elongation stress of greater than 190 kPa to less than 220 kPa, as intended.

On the other hand, the product of Comparative Example 1 employing a high-molecular EPDM having too low an iodine value as component (B) was inferior in compression set resistance, low elongation stress and rigidity. The product of Comparative Example 2 employing a low-molecular EPDM having too low an iodine value as component (A) was inferior in compression set resistance, and in the vicinity of the allowable limits in skin roughness and low elongation stress. The product of Comparative Example 3, not employing any combination of low- and high-molecular rubbers conforming to this invention, but employing a single copolymer having a Mooney viscosity and a Q value each roughness falling between those of the low- and high-molecular polymers, was too high in skin roughness, specific gravity, and low elongation stress and, thus, rigidity. The product of Comparative Example 4, employing too small an amount of vulcanizing agent as component (C), was inferior in compression set resistance. The product of Comparative Example 5, employing too small an amount of foaming agent as component (D) was too high in specific gravity and low elongation stress and, thus, rigidity.

EXAMPLES 4 TO 7 AND COMPARATIVE EXAMPLES 6 TO 11

Rubber compositions were prepared by employing the components as shown in Table 3, and otherwise repeating Examples 1 to 3, and extruded and foamed rubber products were made and tested for physical properties by repeating Examples 1 to 3. The results are shown in Table 3.

In Comparative Example 10, the vulcanizing assistant was a PZ/TT/sulfur compound, and in Comparative Example 11, the foaming agent was an ADCA/urea compound.

As is shown in Table 3, the products of Examples 4 to 7 of this invention showed excellent results in all of the items of evaluation, i.e., a skin roughness <20 RZD, a compression set <40%, a specific gravity <0.45, and low elongation stress greater than 190 kPa to less than 220 kPa, as intended.

On the other hand, the product of Comparative Example 6, employing too large an amount of vulcanizing agent as component (C), was high in specific gravity, inferior in compression set resistance, and too high in low elongation stress and thus, rigidity. The product of Comparative Example 7 employing too large an amount of foaming agent as component (D), was low in specific gravity, inferior in compression set resistance, and too low in low elongation stress and thus, rigidity.

The product of Comparative Example 8, employing too small amounts of process oil and carbon black as components (E) and (F), respectively, was high in specific gravity, inferior in compression set resistance, and too low in low elongation stress and thus, rigidity. The product of Comparative Example 9, employing too large amounts of process oil and carbon black as components (E) and (F), respectively, was too high in specific gravity, inferior in compression set resistance, and too high in low elongation stress and thus, rigidity.

The product of Comparative Example 10, employing a vulcanizing agent outside the scope of this invention as component (C), was too high in skin roughness, inferior in compression set resistance, and somewhat too high in specific gravity and low elongation stress. The product of Comparative Example 11, employing a foaming agent outside the scope of this invention as component (D), was too high in specific gravity, and in low elongation stress and thus, rigidity, though it was satisfactory in skin roughness and compression set resistance.

TABLE 1

| ENB type EPDM | A1 | A2 | B1 | B2 | AB |
|---|---|---|---|---|---|
| $ML_{1+4}$ at 100° C. | 30 | 35 | 113 | 110 | 75 |
| C2/C3 | 58/42 | 58/42 | 60/40 | 60/40 | 55/45 |
| Iodine value | 24 | 10 | 21 | 12 | 24 |
| Q value | 2.8 | 2.8 | 7.4 | 7.1 | 4.7 |

TABLE 2

| | | | Example | | | Comparative Example | | | | |
|---|---|---|---|---|---|---|---|---|---|---|
| | | | 1 | 2 | 3 | 1 | 2 | 3 | 4 | 5 |
| Comparison | Polymer | (A) | A1 | A1 | A1 | A1 | A2 | AB | A1 | A1 |
| | | | 20 | 40 | 30 | 40 | 40 | 100 | 40 | 40 |
| | | (B) | B1 | B1 | B1 | B2 | B1 | — | B1 | B1 |
| | | | 80 | 60 | 70 | 60 | 60 | 0 | 60 | 60 |
| | (C) BZ/PZ/DZ/sulfur = 1:1:1:2 | | 5 | 5 | 5 | 5 | 5 | 5 | 2.5 | 5 |
| | (D) DPT/urea = 1:1 | | 5 | 5 | 5 | 5 | 5 | 5 | 5 | 2.5 |
| | (E) Paraffin oil | | 60 | 60 | 60 | 60 | 60 | 60 | 60 | 60 |
| | (F) SRF carbon *1 | | 90 | 90 | 90 | 90 | 90 | 90 | 90 | 90 |
| Physical | Sponge skin roughness ($\mu$m) | | 16 | 17 | 17 | 18 | 20 | 23 | 18 | 14 |
| properties | Compression set (%) | | 37 | 35 | 33 | 46 | 53 | 39 | 43 | 36 |

TABLE 2-continued

|  | Example | | | Comparative Example | | | | |
| --- | --- | --- | --- | --- | --- | --- | --- | --- |
|  | 1 | 2 | 3 | 1 | 2 | 3 | 4 | 5 |
| Specific gravity as foamed | 0.402 | 0.396 | 0.399 | 0.432 | 0.451 | 0.504 | 0.419 | 0.511 |
| Low elongation stress (kpa) | 203 | 206 | 211 | 178 | 220 | 242 | 183 | 246 |

BZ: Zinc dibutyldithiocarbamate,
PZ: Zinc dimethyldithiocarbamate,
DZ: Benzothiazolylsulfenamide,
DPT: N,N'-dinitrospentamethylenetetramine,
*1: N-762 (ASTM D 1765) High structure.

TABLE 3

|  |  |  | Example | | | | Comparative Example | | | | | |
| --- | --- | --- | --- | --- | --- | --- | --- | --- | --- | --- | --- | --- |
|  |  |  | 4 | 5 | 6 | 7 | 6 | 7 | 8 | 9 | 10 | 11 |
| Comparison | Polymer | (A) | A1 | A1 | A1 | A1 | A1 | A1 | A1 | A1 | A1 | A1 |
|  |  |  | 40 | 40 | 40 | 40 | 40 | 40 | 40 | 40 | 40 | 40 |
|  |  | (B) | B1 | B1 | B1 | B1 | B1 | B1 | B1 | B1 | B1 | B1 |
|  |  |  | 60 | 60 | 60 | 60 | 60 | 60 | 60 | 60 | 60 | 60 |
|  | (C) BZ/CZ/sulfur = 4:1:5 |  | 3.5 | 5 | 5 | 5 | 6.5 | 5 | 5 | 5 | — | 5 |
|  | (C) PZ/TT/sulfur = 2:1:2 |  | — | — | — | — | — | — | — | — | 8 | — |
|  | (D) DPT/urea = 1:1 |  | 5 | 3.5 | 7.5 | 5 | 5 | 8.5 | 5 | 5 | 5 | — |
|  | (D) ADCA/urea = 1:1 |  | — | — | — | — | — | — | — | — | — | 8 |
|  | (E) Paraffin oil |  | 60 | 60 | 60 | 55 | 60 | 60 | 50 | 70 | 60 | 60 |
|  | (F) SRF carbon *1 |  | 90 | 90 | 90 | 85 | 90 | 90 | 75 | 100 | 90 | 90 |
| Physical | Sponge skin roughness (μm) |  | 18 | 16 | 18 | 19 | 18 | 28 | 17 | 26 | 25 | 16 |
| properties | Compression set (%) |  | 34 | 33 | 36 | 35 | 44 | 42 | 43 | 32 | 42 | 35 |
|  | Specific gravity as foamed |  | 0.404 | 0.441 | 0.377 | 0.409 | 0.460 | 0.361 | 0.439 | 0.543 | 0.461 | 0.540 |
|  | Low elongation stress (kPa) |  | 208 | 214 | 198 | 211 | 227 | 169 | 181 | 263 | 226 | 270 |

BZ: Zinc dibutyldithiocarbamate,
CZ: N-cyclohexyl-2-benzothiazolylsulfenamide,
PZ: Zinc dimethyldithiocarbamate,
TT: Tetramethylthiuramdisulfide,
DPT: N,N'-dinitrospentamethylenetetramine,
ADCA: Azodicarbonamide,
*1: N-762 (ASTM D 1765) High structure.

Japanese Patent Application No. HEI-149026 filed Jun. 6, 1997, for which priority is claimed under 35 U.S.C. 119 is incorporated herein, in its entirety, by reference.

What is claimed is:

1. A foam rubber composition comprising:
   (A) a low-molecular ethylene-propylene-5-ethylidene-2norbornene terpolymer having a Mooney viscosity ($ML_{1+4}$ at 100° C.) of about 20 to about 40, an ethylene/propylene ratio (C2/C3) by weight of about 65/35 to about 50/50, an iodine value of about 20 to about 30, and a Q value (Mw/Mn) not exceeding 3 as determined by gel permeation chromatography;
   (B) a high-molecular ethylene-propylene-5-ethylidene-2-norbornene terpolymer having a Mooney viscosity ($ML_{1+4}$ at 100° C.) of about 100 to about 300, an ethylene/propylene ratio (C2/C3) by weight of about 65/35 to about 50/50, an iodine value of about 20 to about 30 and a Q value (Mw/Mn) of about 6 to about 10;
   (C) a vulcanizing system agent containing sulfur as a vulcanizer, and zinc carbamate and sulfenamide as accelerators; and
   (D) a foaming agent containing N,N'-dinitrosopentamethylenetetramine and urea;
   said composition having an (A)/(B) ratio by weight of about 45/55 to about 15/85, and containing about 3.0 to about 6.0 parts by weight of (C) and about 3.0 to about 8.0 parts by weight of (D) relative to a total of 100 parts by weight of (A) and (B).

2. The composition of claim 1, further comprising 52 to 65 parts by weight of (E) process oil and 80 to 95 parts by weight of (F) carbon black relative to a total of 100 parts by weight of (A) and (B).

3. The composition of claim 2, wherein the proportion of said (E) is about 50 to about 68 parts by weight, and the proportion of said (F) is about 82 to about 93 parts by weight relative to a total of 100 parts by weight of (A) and (B).

4. The composition of claim 2, wherein said (E) is paraffin oil, and said (F) is a high structure SRF carbon.

5. A foam rubber composition comprising:
   (A) a low-molecular ethylene-propylene-5-ethylidene-2-norbornene terpolymer having a Mooney viscosity ($ML_{1+4}$ at 100° C.) of about 25 to about 35, an ethylene/propylene ratio (C2/C3) by weight of about 60/40 to about 50/50, an iodine value of about 24 to about 30, and a Q value (Mw/Mn) not exceeding about 3 as determined by gel permeation chromatography;
   (B) a high-molecular ethylene-propylene-5-ethylidene-2-norbornene terpolymer having a Mooney viscosity ($ML_{1+4}$ at 100° C.) of about 100 to about 200, an ethylene/propylene ratio (C2/C3) by weight of about 60/40 to about 50/50, an iodine value of about 20 to about 25 and a Q value (Mw/Mn) of about 7 to about 10;

(C) a vulcanizing system agent containing sulfur as a vulcanizer, and zinc carbamate and sulfenamide as accelerators; and (D) a foaming agent containing N,N'-dinitrosopentamethylenetetramine and urea;

said composition having an (A)/(B) ratio by weight of about 40/60 to about 20/80, and containing about 3.5 to about 5.0 parts by weight of (C) and about 4.0 to about 6.0 parts by weight of (D) relative to a total of 100 parts by weight of (A) and (B).

6. The composition of claim 5, further comprising 50 to 68 parts by weight of (E) process oil and 80 to 95 parts by weight of (F) carbon black relative to a total of 100 parts by weight of (A) and (B).

7. The composition of claim 6, wherein the proportion of said (E) is 50 to 68 parts by weight, and the proportion of said (F) is 82 to 93 parts by weight.

8. The composition of claim 6, wherein said (E) is a paraffin oil, and said (F) is a high structure SRF carbon.

9. A product of foam rubber molded from a composition comprising:

(A) a low-molecular ethylene-propylene-5-ethylidene-2-norbornene terpolymer having a Mooney viscosity ($ML_{1+4}$ at 100° C.) of 20 to 40, an ethylene/propylene ratio (C2/C3) by weight of 65/35 to 50/50, an iodine value of 20 to 30, and a Q value (Mw/Mn) not exceeding 3 as determined by gel permeation chromatography;

(B) a high-molecular ethylene-propylene-5-ethylidene-2-norbornene terpolymer having a Mooney viscosity ($ML_{1+4}$ at 100° C.) of 100 to 300, an ethylene/propylene ratio (C2/C3) by weight of 65/35 to 50/50, an iodine value of 20 to 30 and a Q value (Mw/Mn) of 6 to 10;

(C) a vulcanizing system agent containing sulfur as a vulcanizer, and zinc carbamate and sulfenamide as accelerators; and (D) a foaming agent containing N, N'-dinitrosopentamethylenetetramine and urea;

said composition having an (A)/(B) ratio by weight of 45/55 to 15/85, and containing 3.0 to 6.0 parts by weight of (C) and 3.0 to 8.0 parts by weight of (D) relative to a total of 100 parts by weight of (A) and (B).

10. The product of claim 9, further comprising 52 to 65 parts by weight of (E) process oil and 80 to 95 parts by weight of (F) carbon black relative to a total of 100 parts by weight of (A) and (B).

11. The product of claim 10, wherein the proportion of said (E) is 50 to 68 parts by weight, and the proportion of said (F) is 82 to 93 parts by weight relative to a total of 100 parts by weight of (A) and (B).

12. The product of claim 10, wherein said (E) is paraffin oil, and said (F) is a high structure SRF carbon.

13. A product of foam rubber molded from a composition comprising:

(A) a low-molecular ethylene-propylene-5-ethylidene-2-norbornene terpolymer having a Mooney viscosity ($ML_{1+4}$ at 100° C.) of about 25 to about 35, an ethylene/propylene ratio (C2/C3) by weight of about 60/40 to about 50/50, an iodine value of about 24 to about 30, and a Q value (Mw/Mn) not exceeding about 3 as determined by gel permeation chromatography;

(B) a high-molecular ethylene-propylene-5-ethylidene-2-norbornene terpolymer having a Mooney viscosity ($ML_{1+4}$ at 100° C.) of about 100 to about 200, an ethylene/propylene ratio (C2/C3) by weight of about 60/40 to about 50/50, an iodine value of 20 to 25 and a Q value (Mw/Mn) of about 7 to about 10;

(C) a vulcanizing system agent containing sulfur as a vulcanizer, and zinc carbamate and sulfenamide as accelerators; and (D) a foaming agent containing N, N'-dinitrosopentamethylenetetramine and urea;

said composition having an (A)/(B) ratio by weight of about 40/60 to about 20/80, and containing about 3.5 to 5.0 parts by weight of (C) and about 4.0 to about 6.0 parts by weight of (D) relative to a total of 100 parts by weight of (A) and (B).

14. The product of claim 13, further comprising 50 to 68 parts by weight of (E) process oil and 80 to 95 parts by weight of (F) carbon black relative to a total of 100 parts by weight of (A) and (B).

15. The product of claim 14, wherein the proportion of said (E) is 50 to 68 parts by weight, and the proportion of said (F) is 82 to 93 parts by weight.

16. The product of claim 14, wherein said (E) is paraffin oil, and said (F) is a high structure SRF carbon.

17. A method of making a molded foam rubber product comprising:

i) kneading a composition comprising:

(A) a low-molecular ethylene-propylene-5-ethylidene-2-norbornene terpolymer having a Mooney viscosity ($ML_{1+4}$ at 100° C.) of 20 to 40, an ethylene/propylene ratio (C2/C3) by weight of 65/35 to 50/50, an iodine value of 20 to 30, and a Q value (Mw/Mn) not exceeding 3 as determined by gel permeation chromatography;

(B) a high-molecular ethylene-propylene-5-ethylidene-2-norbornene terpolymer having a Mooney viscosity ($ML_{1+4}$ at 100° C.) of 100 to 300, an ethylene/propylene ratio (C2/C3) by weight of 65/35 to 50/50, an iodine value of 20 to 30 and a Q value (Mw/Mn) of 6 to 10;

(C) a vulcanizing system agent containing sulfur as a vulcanizer, and zinc carbamate and sulfenamide as accelerators; and (D) a foaming agent containing N, N'-dinitrosopentamethylenetetramine and urea;

said composition having an (A)/(B) ratio by weight of 45/55 to 15/85, and containing 3.0 to 6.0 parts by weight of (C) and 3.0 to 8.0 parts by weight of (D) relative to a total of 100 parts by weight of (A) and (B);

ii) extruding said composition through an extruder; and iii) vulcanizing said composition to yield said molded foam rubber product.

18. A method of making a molded foam rubber product comprising:

i) kneading a composition comprising:

(A) a low-molecular ethylene-propylene-5-ethylidene-2-norbornene terpolymer having a Mooney viscosity ($ML_{1+4}$ at 100° C.) of about 25 to about 35, an ethylene/propylene ratio (C2/C3) by weight of about 60/40 to about 50/50, an iodine value of about 24 to about 30, and a Q value (Mw/Mn) not exceeding about 3 as determined by gel permeation chromatography;

(B) a high-molecular ethylene-propylene-5-ethylidene-2-norbornene terpolymer having a Mooney viscosity ($ML_{1+4}$ at 100° C.) of about 100 to 200, an ethylene/propylene ratio (C2/C3) by weight of about 60/40 to 50/50, an iodine value of 20 to 25 and a Q value (Mw/Mn) of about 7 to 10;

(C) a vulcanizing system agent containing sulfur as a vulcanizer, and zinc carbamate and sulfenamide as accelerators; and (D) a foaming agent containing N,N'-dinitrosopentamethylenetetramine and urea;

said composition having an (A)/(B) ratio by weight of about 40/60 to about 20/80, and containing about 3.5 to about 5.0 parts by weight of (C) and about 4.0 to about 6.0 parts by weight of (D) relative to a total of 100 parts by weight of (A) and (B);

ii) extruding said composition through an extruder; and iii) vulcanizing said composition to yield said molded foam rubber product.

19. The foam rubber composition of claim 1, wherein the vulcanizing system agent of (c) contains a sulfur, zinc carbamate and sulfenamide ratio in a range of 1:3:3 to 4:2:1.

20. The foam rubber composition of claim 5, wherein the vulcanizing system agent of (c) contains a sulfur, zinc carbamate and sulfenamide ratio in a range of 1:3:3 to 4:2:1.

21. The foam rubber composition of claim 1, wherein a thiazole vulcanizing accelerator is present in addition to the accelerators zinc carbamate and sulfenamide.

22. The foam rubber composition of claim 5, wherein a thiazole vulcanizing accelerator is present in addition to the accelerators zinc carbamate and sulfenamide.

* * * * *